July 2, 1946.　　　　R. R. RANEY　　　　2,403,396
TYING MECHANISM
Filed Nov. 17, 1943　　　　7 Sheets-Sheet 7

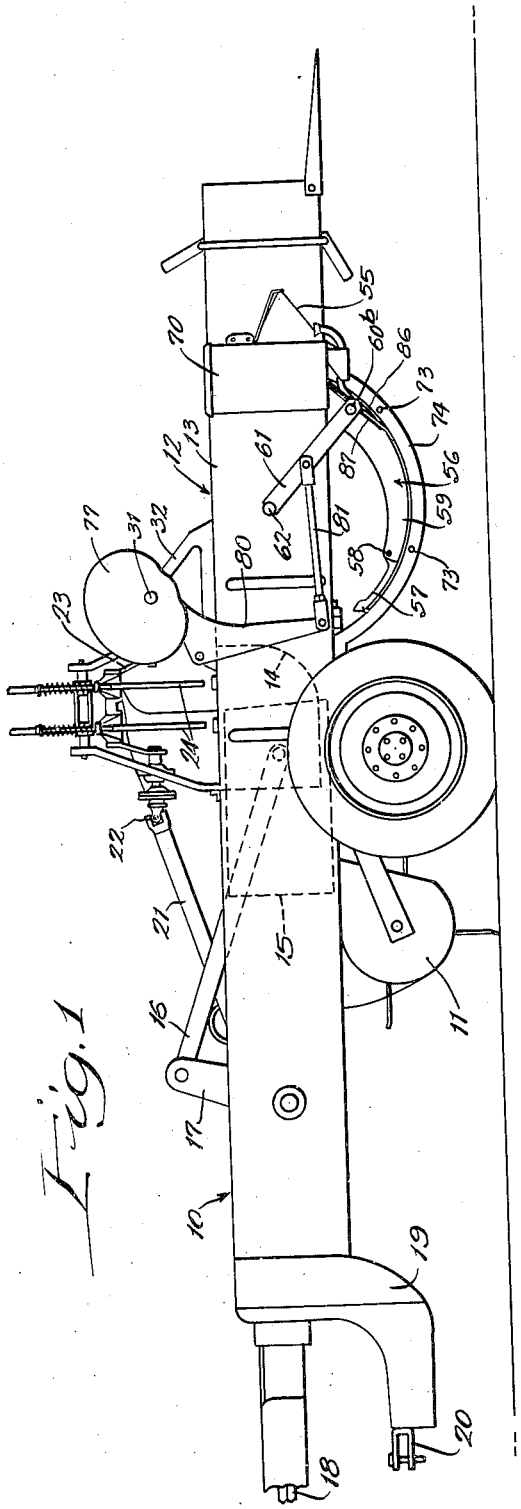

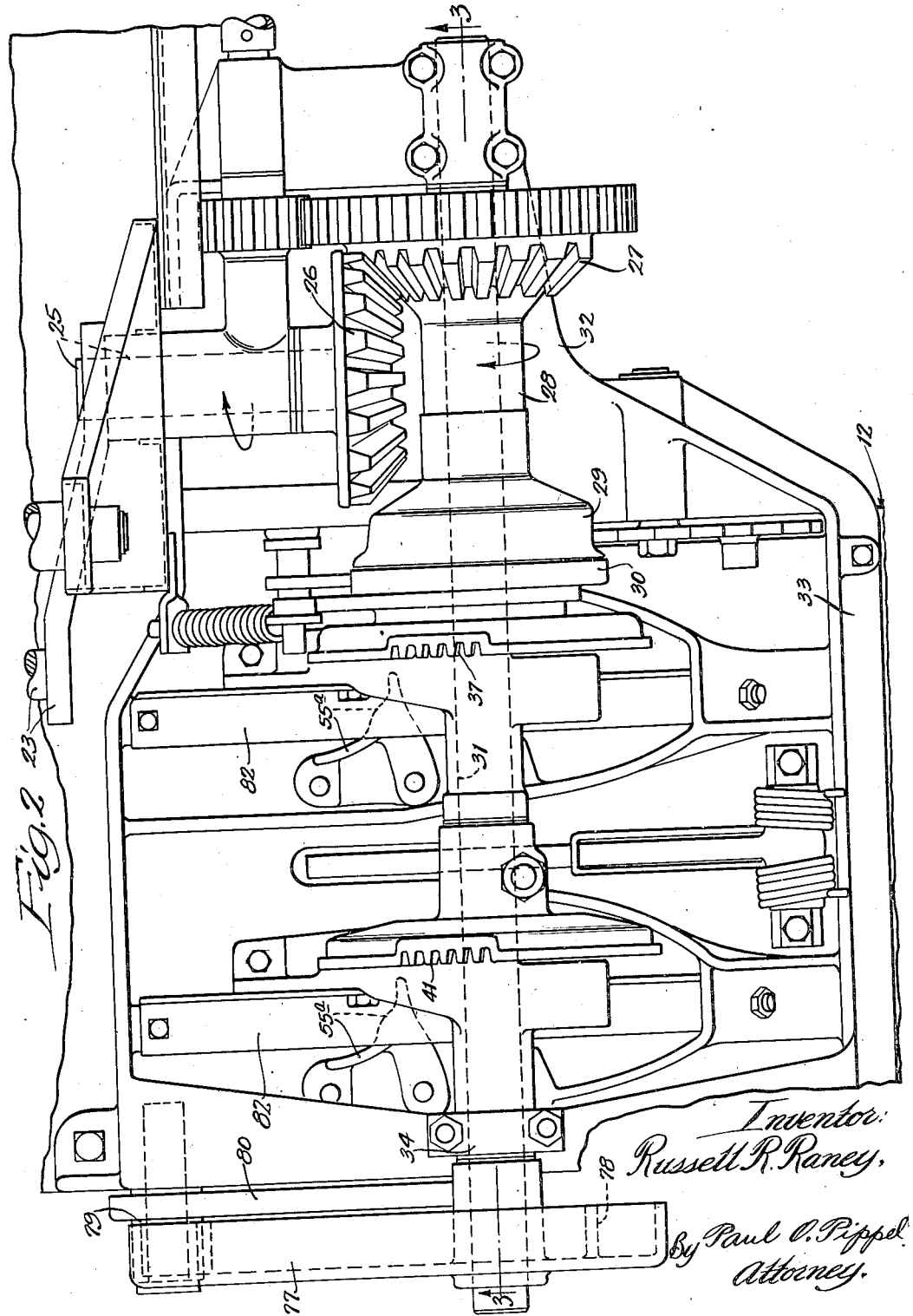

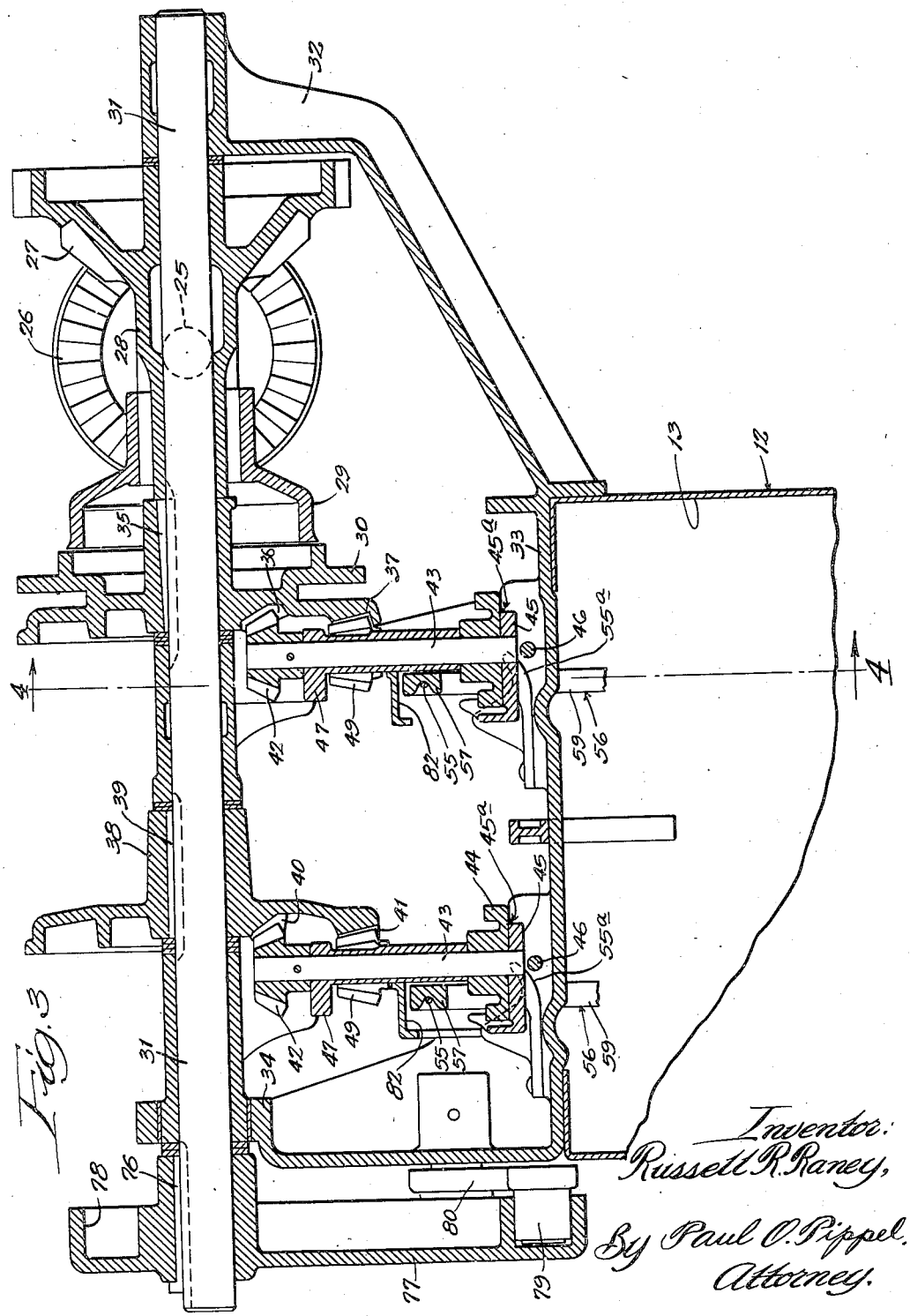

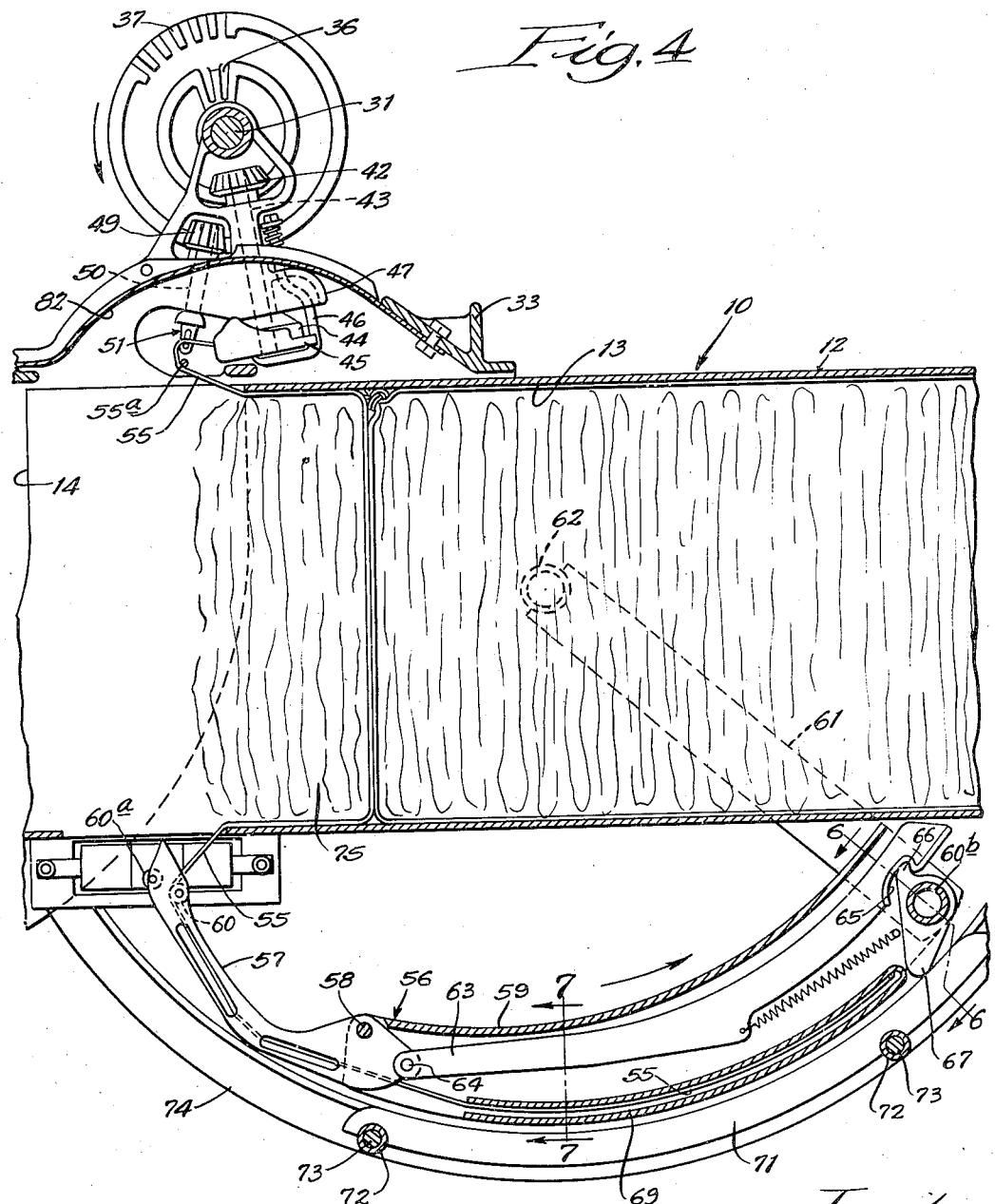

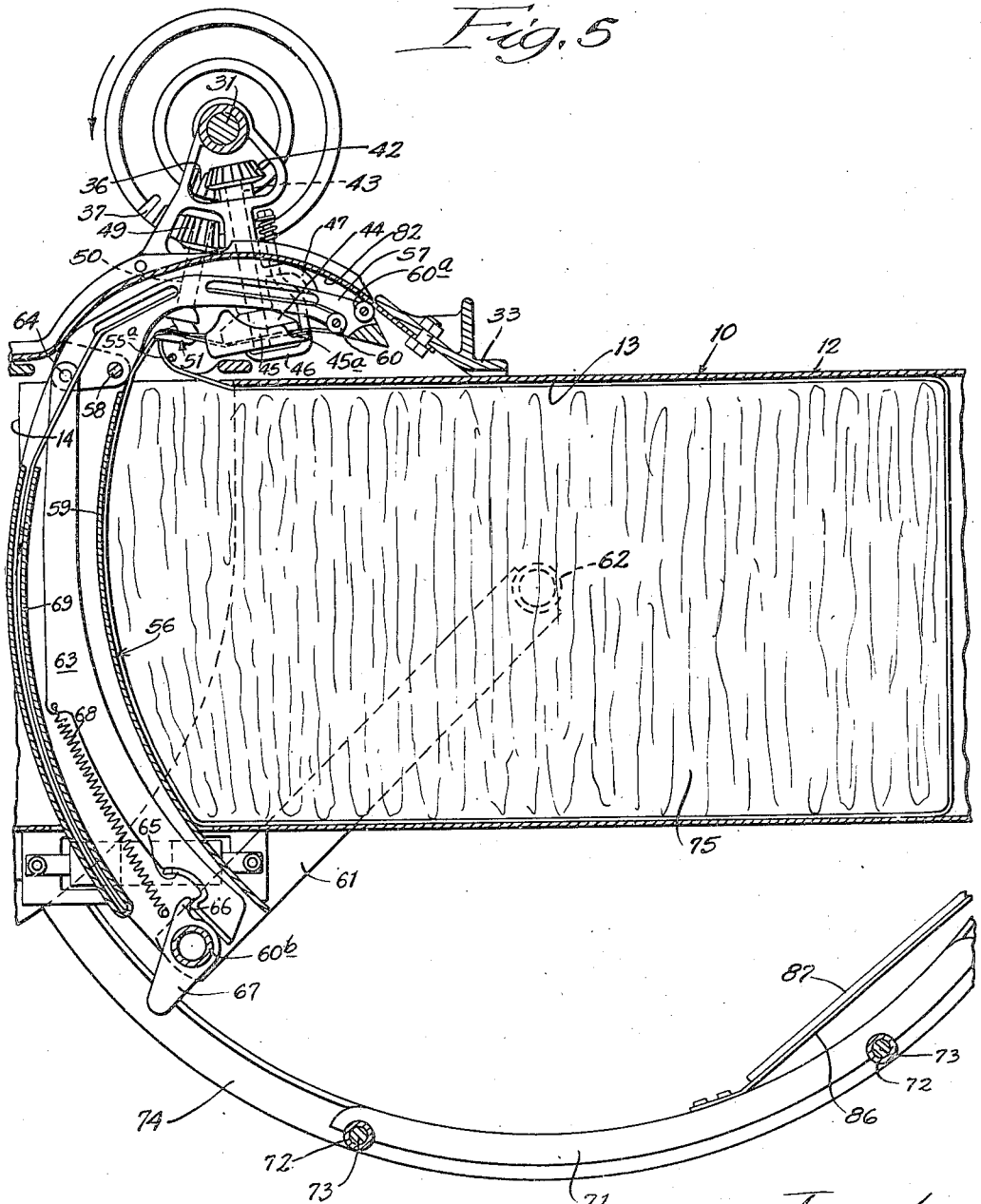

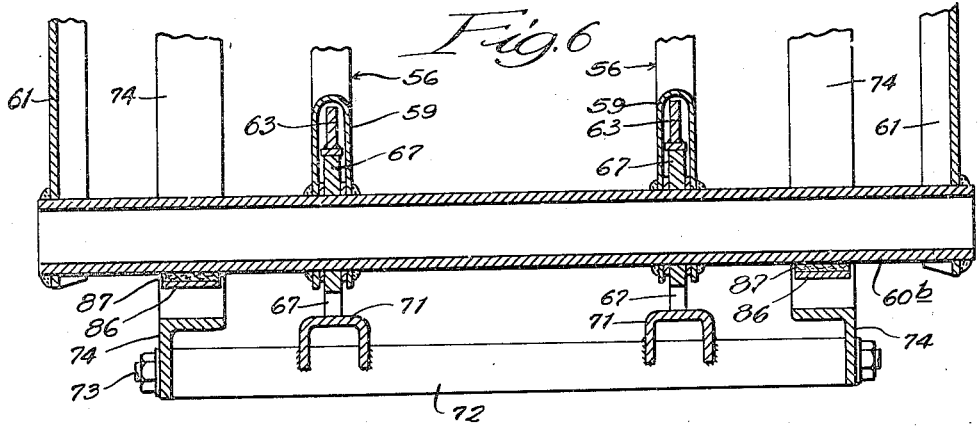
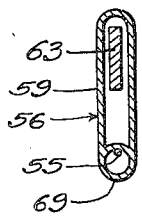
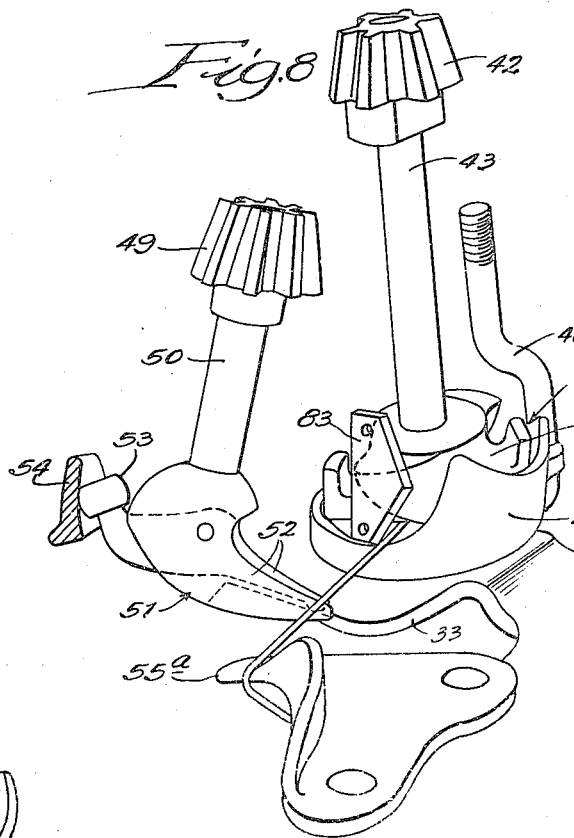
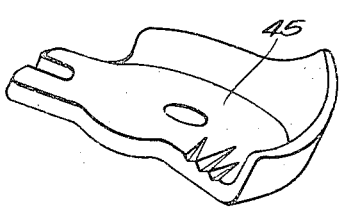

Inventor:
Russell R. Raney,

By Paul O. Pippel.
Attorney.

Patented July 2, 1946

2,403,396

UNITED STATES PATENT OFFICE 2,403,396

TYING MECHANISM

Russell R. Raney, La Grange, Ill., assignor to International Harvester Company, a corporation of New Jersey Application November 17, 1943, Serial No. 510,582

18 Claims. (Cl. 100—20)

This invention relates to a tying mechanism. More specifically, it relates to a tying mechanism for a baler.

It may be desirable for various reasons that a pick-up baler have a feed opening in its vertical side. If the feed opening is in the vertical side of the baling chamber, the tying means should be vertically arranged. The tying mechanism per se should be on top of the baling chamber, and the means by which the tying strand is fed across the baling chamber to the tying means should move from a position below the baling chamber and vertically up across the baling chamber.

The tying strand feeding means in its extreme position below the baling chamber requires some protection, and it is necessary that this extreme position below the baling chamber be not so low as to come to ground level. The present application has to do with a tying means designed to avoid certain difficulties arising when the parts thereof are placed as discussed above.

An object of the present invention is to provide an improved tying means.

Another object is the provision of an improved tying means for a baler.

A further object is to provide an improved tying means for use with a baler having a feed opening in the vertical side thereof.

Other objects will appear from the disclosure.

According to the present invention, a novel tying mechanism involves a vertically moving needle having a pivoted end portion. The needle moves vertically upwardly across a baling chamber, and upon reaching the upper end contacts a cam track that causes the pivoted end to bend with respect to the remainder of the needle and move along the top of the baling chamber. The tying operation is performed by a bill-hook, and the knot formed by the bill-hook is removed from the bill-hook by movement of the tied bale through the baling chamber caused by the compressing of additional material to be baled against the tied bale by a baling plunger. The arcuate needle is secured to an arm pivotally connected to the baling chamber for providing the arcuate needle with circular movement. There is provided beneath the baling chamber a member faced with braking material that serves to brake the arcuate needle and arm in one extreme position.

In the drawings:

Figure 1 is a side view of a pick-up baler employing the novel tying mechanism of the present invention;

Figure 2 is a plan view of a portion of the structure shown in Figure 1 of the tying means;

Figure 3 is a sectional view taken on the line 3—3 of Figure 2;

Figure 4 is a sectional view taken on the line 4—4 of Figure 3;

Figure 5 is a sectional view similar to Figure 4 with certain parts in a different position;

Figure 6 is a sectional view taken on the line 6—6 of Figure 4;

Figure 7 is a sectional view taken on the line 7—7 of Figure 4;

Figure 8 is a perspective view of a portion of the tying means;

Figure 9 is a perspective view of a single element of the tying means; and

Figure 10:
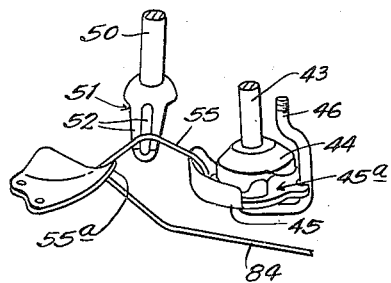

Figures 10 to 15, inclusive, are perspective views of the novel tying means of the present invention in different positions.

The reference character 10 designates a pick-up baler comprising generally a side-mounted pick-up device 11 in relation to a longitudinal baling unit 12. The pick-up baler is shown more completely in the copending application of Crumb et al., Serial No. 466,460, filed November 21, 1942. The baling unit 12 includes a baling chamber 13 having an opening 14 in a vertical side thereof and a baling plunger 15 mounted in the baling chamber 13 for reciprocation. The baling plunger 15 is actuated by a connecting rod 16 driven by a crank 17. The crank 17 in turn is driven by a power take-off shaft 18 extending from a tractor, not shown, and connected with the crank 17 through power-transmitting means, not shown. The forward portion of the baling unit 12 has a hitch structure 19 carrying a clevis 20 for connecting the pick-up baler 10 to the aforementioned tractor, not shown. Also connected with the power take-off shaft 18 through the power-transmitting means is a shaft 21, which extends upwardly and rearwardly and connects through a universal joint 22 with a crank structure 23 which operates packing members 24. These packing members serve to move material to be baled, such as hay, from a transverse platform, not shown, behind the pick-up device 11 laterally through the feed opening 14 into the baling chamber 13. The baling plunger 15 compresses the material within the chamber into a bale, and it is tied with the improved mechanism now to be described.

As seen in Figure 2, the rear end of the crank structure 23 carries a longitudinal shaft 25 to which is secured a bevel gear 26. The bevel gear 26 meshes with a bevel gear 27 formed on a sleeve 28, which has an enlarged portion 29 serving as part of a clutch. The clutch portion 29 engages a clutch part 30 secured to a transverse shaft 31. The shaft 31 is journaled at one end in a bracket extension 32 formed on a top 33 of the baling chamber 13. The other end of the shaft 31 is journaled in a vertical bracket extension 34 formed on the top 33 of the baling chamber 13. The clutch part 30 is secured to the shaft 31 by a key 35 and carries an inner segmental gear portion 36 and an outer segmental gear portion 37. A member 38 secured to the shaft 31 by a key 39 carries inner and outer segmental gear portions 40 and 41 similar to the gear portions 36 and 37. A bevel gear 42 secured to a vertical shaft 43 supported on the top 33 meshes with the inner segmental gear 36. Secured to the shaft 43 is a cord holder disk 44. This disk 44 rests against a cord holder plate 45 carried on a bolt 46 (Figure 8). The disk 44 and plate 45 constitute a complete cord holder 45a. The bolt 46 extends upwardly and is threaded in a bracket 47 which is supported upon the shaft 31 and carries the upper end of the shaft 43 in the gear 42 to provide a journal support for the same. Similarly, there is a second bevel gear 42 engaging the inner segmental gear 40 on the member 38, which bevel gear is secured to the upper end of a second vertical shaft 43 carrying at its lower end another cord holder disk 44. As described in the other unit this second cord holder disk 44 rests against a cord holder plate 45 secured to a similar bolt 46 threaded into a bracket 47 supported upon the shaft 31. A bevel gear 49 meshes with the outer segmental gear 37 and is secured to a suitably supported shaft 50 (Figures 4 and 8) carrying at its lower end a bill-hook 51 formed of cooperating relatively movable jaws 52. The one jaw 52 has secured to it a follower 53 engaging a cam 54. Similarly, there is another corresponding bevel gear 49 meshing with the outer segmental gear 41 on the member 38. This bevel gear 49 is secured to a shaft 50 carrying at its lower end a bill-hook 51 composed of relatively movable jaws 52. The bill-hook 51 and the cord holder 45a are old per se and are associated with one another in an old and well-known manner, as shown in the patent to Benjamin 865,754, September 10, 1907.

Figures 4 and 10 show the end of a cord or tying strand 55 held in the cord holder and extending across the bill-hook 51, around a guide 55a, along the upper side of the baling chamber 13, then vertically down across the baling chamber 13 to the bottom thereof and along the bottom. The tying strand 55 then enters an arcuate needle 56 now to be described. This arcuate needle 56 includes an end part 57 pivoted at 58 on a hollow member 59. The end part 57 carries rollers 60 and 60a. The hollow member 59 is secured to a tubular member 60b secured in turn to arms 61, as shown in Figure 6. The arms 61 are pivotally connected, as indicated at 62, to opposite vertical sides of the baling chamber 13. Only one arcuate needle 56 has been described, but there are two such needles, Figure 6 showing two hollow members 59 secured to the tubular member 60b. For each arcuate needle 56 there is a link 63 pivotally connected at 64 to the end part 57 at one end and having at the other end a notch 65. The notch 65 is engaged by a hook portion 66 formed on a member 67 mounted on the tubular member 60b. Thus the end part 57 is held in general arcuate alinement with the member 59 against pivoting with respect thereto.

A spring 68 is connected between the link 63 and the hollow member 59. As shown in Figure 7, the hollow member 59 has a circular tubular portion 69 through which the tying strand 55 extends. The tying strand extends to a holder 70 for a coil of the strand secured to one side of the baling chamber 13. Figure 1 shows the holder 70 for one cord 55 for one arcuate needle 56, and at the opposite side of the baling chamber is another holder, not shown, for the other cord 55.

Figure 4 shows the needle 56 in its lowermost position beneath the baling chamber 13. The hook portion 66 of the member 67 engages the notch 65 in the link 63, preventing longitudinal movement of the link 63 in the hollow member 59, thus preventing pivotal movement of the end part 57 of the needle. The hook portion 66 is held in engagement with the notch 65 by means of an arcuate channel 71 secured to transverse sleeves 72 mounted upon bolts 73. The bolts 73 are supported by side arcuate angle members 74 secured under and on opposite sides of the baling chamber 13.

Figure 11:
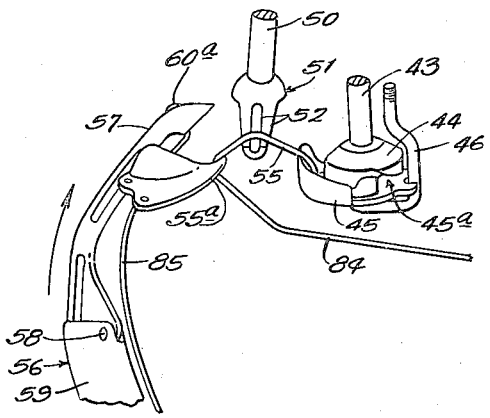
Figure 12:
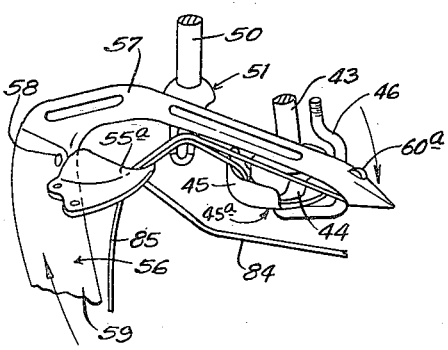
Figure 13:
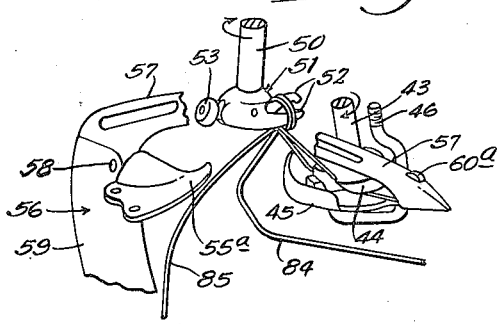
Figure 14:
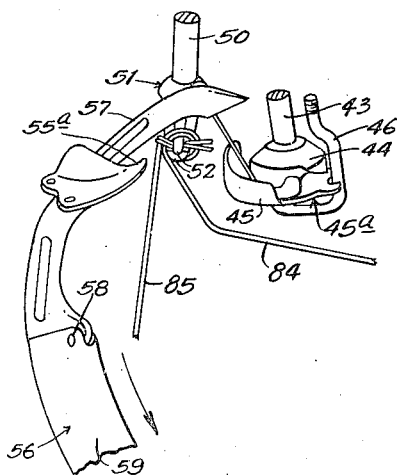
Figure 15:
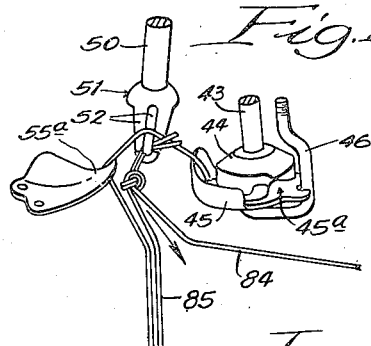

Figure 4 shows only a very small mass of untied and unbaled material 75 in the baling chamber 13. Material is fed by the crank packer structure 23 into the baling chamber through the feed opening 14 and is compressed by the baling plunger 15 until a predetermined amount is reached, as shown in Figure 5. When a predetermined amount of material has been reached, automatic means causes an engagement between the clutch portion 29 of the sleeve 28 and the clutch part 30 so that rotation of the part 29 causes the part 30 and the shaft 31 to commence rotating. The gear segments 36, 37, 40, and 41 rotate, and upon reaching the proper position engage the bevel gears 42 and 49, causing them to rotate. These in turn cause the bill-hook 51 and the cord holder disk 44 to rotate. The shaft 31 has secured to one end, by a key 76, a cam 77 having a track 78 engaged by a follower 79 carried by a bell-crank 80. The bell-crank 80 is connected by a link 81 to one arm 61. Rotation of the cam 77 causes an angular movement of the bell-crank 80 that is transmitted through the link 81 to the arm 61. The arm 61 moves clockwise, as viewed in Figure 1, causing the arcuate needles 56 to move upwardly through the baling chamber 13 toward the position of Figure 5, and to feed the tying strand 55 in the form of a bight across the baling chamber 13. Secured to the top member 33 of the baling chamber 13 is a pair of arcuate tracks 82. When the pivoted end part 57 of the needle reaches the top of the baling chamber 13, the roller 60a thereon moves into engagement with the arcuate cam track 82, and the part 57 thus pivots with respect to the hollow member 59, as shown in Figure 5, moving in a general way along the top of the baling chamber 13. This pivoting may take place because the member 67 has moved out of engagement with the arcuate channel 71, permitting disengagement of the hook portion 66 from the notch 65. Figure 11 shows the relation of the end portion 57 to the bill-hook 51 and the cord holder just before pivoting of the end part has taken place. Figure 12 shows the relation of these parts after the pivoting of the end part has taken place. The portion of the cord 55 fed across the baling chamber 13 by the arcuate needle 56 now extends across the bill-hook 51 and into engagement with the cord holder disk 44. Thereupon, engagement of the inner gear segment 40 with the bevel gear 42 causes the cord holder disk 44 to rotate and grip the portion of the cord 55 extended across it, as shown in Figure 13. Simultaneously, the engagement of the inner gear segment 40 with the bevel gear 42 causes the bill-hook to rotate and form a loop about itself in the two portions of the cord 55, as shown in Figure 13. Further rotation of the bill-hook in the cord holder part causes the cord 55 to move into engagement with a knife 83 secured to the cord holder plate 45, as shown in Figure 8. The knife severs the cord, and the bill-hook moves to the position of Figure 14 in which the jaws thereof have opened and closed upon parts of the cord 55. Then the arcuate needles 56 are withdrawn to the position of Figure 4. The end part 57 of each needle 56 tends to return to general arcuate alinement with the member 59 upon withdrawal of the needle sufficiently to disengage the end part 57 from the cam track 82 because the spring 68 pulls the link 63 back. The arcuate channel 71 reengages the part 67 causing the hook portion 66 to reengage the notch 65, causing the end part 57 again to be held in general arcuate alinement with the member 59. Thereupon, more material is fed into the baling chamber, and the plunger, acting against this additional material, causes the mass of material 75 surrounded by the cord 55 to move through the baling chamber. A comparison of Figures 14 and 15 will illustrate this movement. Reference characters 84 and 85 designate horizontal and vertical portions of the cord surrounding the mass of material 75 and thus indicate the top and end of the baled mass. Their positions in the two figures will show that they have moved with respect to the bill-hook 51. This movement of the baled material 75 surrounded by the cord 55 through the baling chamber 13 causes the knot formed in the cord 55 to be pulled off the bill-hook 51 and completed as shown in Figure 15.

Secured yieldingly to each arcuate angle member 74 is a flat spring element 86 upon which is placed a facing 87 of braking material. The facing 87 lies in the path of the tubular member 60b so that the facing engages the tubular member upon return of the needles 56 to the position of Figure 4 so as to yieldingly brake or cushion the needles and arms 61 and prevent injurious contact of the parts with the under side of the baling chamber 13.

The relationship of the end part 57 of the needle 56, the bill-hook 51, and the cord holder illustrated in Figures 10 to 15, inclusive, is not novel with the present application but is substantially as shown in the aforementioned Benjamin patent. One novel feature in the present application lies in the pivotal connection of the end part 57 with the hollow member 58 and the cam track 82 for causing the end part 57 to pivot and to move generally along the top of the baling chamber 13. It is this pivotal connection of the end part 57 and the movement of it along the top of the baling chamber 13 that makes possible a proper tying of the bale and the desired relationship of the parts which accomplish the tying. If the end part 57 did not pivot and did not move along the baling chamber 13, it would continue upwardly above the baling chamber, and the tying would have to take place so far from the mass of material being baled that the bale would be tied too loosely. If the end part 57 were to occupy the positions with respect to the bill-hook 51 and the cord holder shown in Figures 10 to 15, inclusive, without a pivoting of the end part with respect to the member 59, the arcuate needle 56 would have to be shifted so that in its lowermost position it would come dangerously close to ground level. By providing the center of movement 62 of the arcuate needle 56 on the sides of the baling chamber 13 about half way between the top and bottom, applicant has been able to keep the arcuate needle 56 safely away from the ground in the lowermost position of Figure 4. However, this arrangement has required that the end part 57 of the needle be pivoted with respect to the member 59 thereof. This entire arrangement is of special significance to a pick-up baler that has a feed opening in a vertical side of the baling chamber, since this necessarily involves vertically arranged and vertically moving tying parts. However, it should be understood that the movably connected or pivoted end of the needle is not to be limited to pick-up balers but may be applied wherever tying is to be accomplished.

As previously described with reference to Figures 14 and 15, removal of the knot formed in the cord or tying strand 55 is accomplished by movement of the tied mass of material through the bale chamber by the pressing of more material by the baling plunger 15. This feature is submitted as novel.

The arrangement of the strip 86 and its facing 87 of braking material for braking the arcuate needles 55 on their return to the position of Figure 4 is also believed to be novel.

The intention is to limit the invention only within the scope of the appended claims.

What is claimed is:

1. In combination, means forming a chamber for a mass of material to be tied, a supporting member movable across one side of the mass, a tying-strand-carrying element movably connected to the supporting member, means for moving the supporting member across the said one side of the mass to bring the element across the said one side to an adjacent side of the mass, and means positioned at the said adjacent side to cause the element to move along the said adjacent side of the mass.

2. In combination, means forming a chamber for a mass of material to be tied, a supporting member movable across one side of the mass, a tying-strand-carrying element movably connected to the supporting member, means for moving the supporting member across the said one side of the mass to bring the element across the said one side to an adjacent side of the mass, tying means positioned at the said adjacent side, and means positioned at the said adjacent side to cause the element to move along the said adjacent side of the mass to the tying means.

3. In combination, means forming a chamber for a mass of material to be tied, a supporting member pivotally mounted at a point between two opposite sides of the mass so as to be movable across an adjacent side from one opposite side to the other opposite side, a tying-strand-carrying element movably connected to the supporting member, means for moving the supporting member across the said adjacent side of the mass from the said one opposite side to the said other opposite side to bring the element to the said other opposite side, and means positioned at the said other opposite side to cause the element to move along the said other opposite side.

4. In combination, means forming a chamber for a mass of material to be tied, a supporting member pivotally mounted at a point between two opposite sides of the mass so as to be movable across an adjacent side from one opposite side to the other opposite side, a tying-strand-carrying element movably connected to the supporting member, means for moving the supporting member across the said adjacent side of the mass from the said one opposite side to the said other opposite side to bring the element to the said other opposite side, tying means positioned at the said other opposite side of the mass, and means positioned at the said other opposite side to cause the element to move along the said other opposite side to the tying means.

5. In combination, means forming a chamber for a mass to be tied, a supporting member movable from one side of the mass to the opposite side across an adjacent side, a carrying element movably connected to the supporting element and adapted to carry one end of a tying strand having the other end held at the said opposite side of the mass and extending around the mass, means for moving the supporting member and carrying element across the said adjacent side of the mass to bring the tying strand to the said opposite side of the mass, and means positioned at the said opposite side of the mass to cause the element to move along the said opposite side and to bring the said one end of the tying strand to the other held end.

6. In combination, means forming a chamber for a mass to be tied, a supporting member movable from one side of the mass to the opposite side across an adjacent side, a carrying element movably connected to the supporting element and adapted to carry one end of a tying strand having the other end held at the said opposite side of the mass and extending around the mass, means for moving the supporting member and carrying element across the said adjacent side of the mass to bring the tying strand to the said opposite side of the mass, tying means positioned at the said opposite side of the mass adjacent the held end of the tying strand, and means positioned at the said opposite side of the mass to cause the element to move along the said opposite side and to bring the said one end of the tying strand to the other held end and the tying means.

7. In combination, means forming a baling chamber, and means for passing a tying strand through the baling chamber from one side thereof to the other side, said means comprising a needle having a tying-strand-carrying portion at one end pivotally connected to the remainder of the needle so as to be movable out of general alinement with the remainder, means yieldingly holding the portion and the remainder in general alinement, means movably mounting the other end of the needle at the said one side of the baling chamber, means for moving the needle through the baling chamber from the said one side thereof to the other side, the tying-strand-carrying portion first, and a track positioned at the said other side of the baling chamber for engaging the tying-strand-carrying portion of the needle upon its arrival at the said other side to cause the said portion to pivot about the remainder of the needle and to move along the baling chamber.

8. In combination, means forming a baling chamber, and means for passing a tying strand through the baling chamber from one side thereof to the other side, said means comprising a mounting arm pivotally connected at one end to the baling chamber, an arcuate needle secured by one end to the other end of the mounting arm and having a tying-strand-carrying portion at the other end pivoted on the remainder of the needle so as to be movable out of arcuate alinement with the remainder, means yieldingly holding the said portion of the needle in arcuate alinement with the remainder, means for moving the arcuate needle through the baling chamber from the said one side thereof to the other side, and means positioned at the said other side of the baling chamber for engaging the tying-strand-carrying portion of the arcuate needle upon its arrival at the said other side to cause the said portion to pivot about the remainder of the needle and to move along the baling chamber.

9. In combination, a baling chamber extending in a certain direction, a plunger mounted in the chamber for reciprocation in the said certain direction, tying means for feeding a tying strand from one side of the baling chamber to the other side, said means comprising a needle having a tying-strand-carrying portion at one end movably connected with the remainder of the needle so as to be movable out of general alinement with the remainder, means yieldingly holding the said portion and the remainder in general alinement, means movably mounting the needle for pivoting about an axis between the aforementioned sides of the baling chamber, means for moving the needle through the baling chamber from the said one side thereof to the said other side, the tying-strand-carrying portion first, and a track positioned at the said other side of the baling chamber for engaging the tying-strand-carrying portion of the needle upon its arrival at the said other side to cause the said portion to move with respect to the remainder of the needle and to move along the baling chamber.

10. In combination, baling means comprising a chamber extending in a certain direction and a plunger mounted in the chamber for reciprocation in the said certain direction, means for feeding a tying strand from one side of the bale chamber to the other, comprising an arm pivotally mounted at one end on the baling chamber between the aforementioned sides thereof, an arcuate needle having one end secured to the other end of the arm and having at the other end of the needle a portion pivotally connected to the remainder thereof, means yieldingly holding the said portion of the needle in general arcuate alinement with the remainder thereof, a track positioned at the said other side of the bale chamber, and means for moving the needle from the said one side of the bale chamber to the said other side and causing the said end portion of the needle by contact with the track to move out of general arcuate alinement with the remainder of the needle and along the track.

11. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising a member having an end portion pivotally connected with the remainder of the member and being mounted for movement across the baling chamber from the said other side thereof to the said one side thereof, the said end portion first, and means positioned at the said one side of the baling chamber for engaging the said end portion of the member upon its arrival at the said one side of the baling chamber to cause the said end portion to pivot with respect to the remainder of the member and to move along the said one side to the tying means.

12. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising a member having an end portion pivotally connected with the remainder of the member and being mounted for movement across the baling chamber from the said other side thereof to the said one side thereof, the said end portion first, means positioned at the said one side of the baling chamber for engaging the said end portion of the member upon its arrival at the said one side of the baling chamber to cause the said end portion to pivot with respect to the remainder of the member and to move along the said one side to the tying means, and means yieldingly urging the said end portion of the member into general alinement with the remainder thereof upon disengagement of the said end portion of the previously mentioned means.

13. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising a member having an end portion pivotally connected with the remainder of the member and being mounted for movement across the baling chamber from the said other side thereof to the said one side thereof, the said end portion first, means positioned at the said one side of the baling chamber for engaging the said end portion of the member upon its arrival at the said one side of the baling chamber to cause the said end portion to pivot with respect to the remainder of the member and to move along the said one side to the tying means, and means for positively holding the end portion of the member against pivoting with respect to the remainder thereof before engagement of the end portion with the previously mentioned means.

14. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising a member having an end portion pivotally connected with the remainder of the member and normally generally alined therewith and being mounted for movement across the baling chamber from the said other side thereof to the said one side thereof, the said end portion first, means positioned at the said one side of the baling chamber for engaging the said end portion of the member upon its arrival at the said one side of the baling chamber to cause the said end portion to pivot out of general alinement with the remainder of the member and to move along the said one side to the tying means, means for yieldingly returning the said end portion of the member to general alinement with the remainder thereof upon disengagement of the said end portion from the previously mentioned means, and means for positively holding the end portion of the member against pivoting out of general alinement with the remainder before engagement with the said previously mentioned means.

15. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising a member having an end portion pivotally connected with the remainder of the member and normally generally alined therewith and being mounted for movement across the baling chamber from the said other side thereof to the said one side thereof, the said end portion first, means positioned at the said one side of the baling chamber for engaging the said end portion of the member upon its arrival at the said one side of the baling chamber to cause the said end portion to pivot out of general alinement with the remainder of the member and to move along the said one side to the tying means, and means for positively holding the end portion of the member against pivoting out of general alinement with the remainder thereof before engagement of the end portion with the previously mentioned means, said holding means comprising a link connected at one end to the said end portion of the member and having at the other end a notch, an element movably mounted at the end of the member opposite the said pivoted end portion and engageable with the notch in the link, and means for holding the element in engagement with the notch to prevent movement of the link and thus pivoting of the end portion of the member out of general alinement with the remainder of the member.

16. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising an arm pivotally mounted between the said sides of the baling chamber, a member having an end portion pivotally connected with the remainder of the member and normally generally alined therewith and being secured by its other end to the arm, means for moving the arm about its pivot to move the member across the baling chamber from the said other side thereof to the said one side thereof, the pivoted end portion first, means positioned at the said one side of the baling chamber for engaging the said end portion of the member upon its arrival at the said one side of the baling chamber to cause the said end portion to pivot out of general alinement with the remainder and to move along the said one side to the tying means, and means for positively holding the end portion of the member against pivoting out of general alinement with the remainder thereof before engagement of the end portion with the previously mentioned means, said holding means comprising a link connected at one end to the said end portion of the member and having at the other end a notch, an element movably mounted at the end of the member secured to the arm and engageable with the notch in the link, and means positioned at the said other side of the baling chamber for holding the element in engagement with the notch to prevent movement of the link and thus pivoting of the end portion of the member out of general alinement with the remainder of the member.

17. In combination, a baling chamber extending in a certain direction, a plunger mounted in the baling chamber for reciprocation in the said certain direction, the baling chamber being adapted to hold a mass of material to be baled by the compressing action of the baling plunger and to be tied by a tying strand extending from a held end at one side of the baling chamber and across the baling chamber to the opposite side thereof, tying means positioned at the one side of the baling chamber adjacent the held end of the tying strand, and means for feeding a portion of the tying strand in the form of a bight from the said other side of the baling chamber to the said one side to bring part of the bight into engagement with the tying means for tying the held end of the tying strand to the said part of the bight, said feeding means comprising an arm pivotally mounted between the said sides of the baling chamber, an arcuate member having an end portion pivotally connected with the remainder of the member and normally generally arcuately alined therewith and being secured by its other end to the arm, means for moving the arm about its pivot to move the member across the baling chamber from the said other side thereof to the said one side thereof, the pivoted end portion first, means positioned at the said one side of the baling chamber for engaging the said end portion of the member upon its arrival at the said one side of the baling chamber to cause the said end portion to pivot out of general arcuate alinement with the remainder and to move along the said one side to the tying means, and means for positively holding the end portion of the member against pivoting out of general arcuate alinement with the remainder thereof before engagement of the end portion with the previously mentioned means, said holding means comprising a link connected at one end to the said end portion of the member and having at the other end a notch, an element movably mounted at the end of the member secured to the arm and engageable with the notch in the link, and a guard positioned at the said other side of the baling chamber for protecting the arcuate member and having a portion engageable with the link for holding the element in engagement with the notch to prevent movement of the link and thus pivoting of the end portion of the member out of general arcuate alinement with the remainder of the member.

18. In combination, a baling chamber extending in a certain direction, a baling plunger mounted in the baling chamber for reciprocation in the said certain direction, means for feeding a tying strand across the baling chamber, said feeding means comprising an arm pivotally mounted on the baling chamber and an arcuate member secured to the arm, the arm and member being oscillatable about the pivot mounting, an arcuate guard positioned adjacent the baling chamber for protecting the member, and braking means associated with the guard for stopping the arm and member in one extreme position of oscillation.

RUSSELL R. RANEY.